A. GUYOT.
PROCESS OF MAKING ACETIC ACID BY OXIDATION OF ACETIC ALDEHYDE.
APPLICATION FILED APR. 25, 1918.
1,409,098.
Patented Mar. 7, 1922.
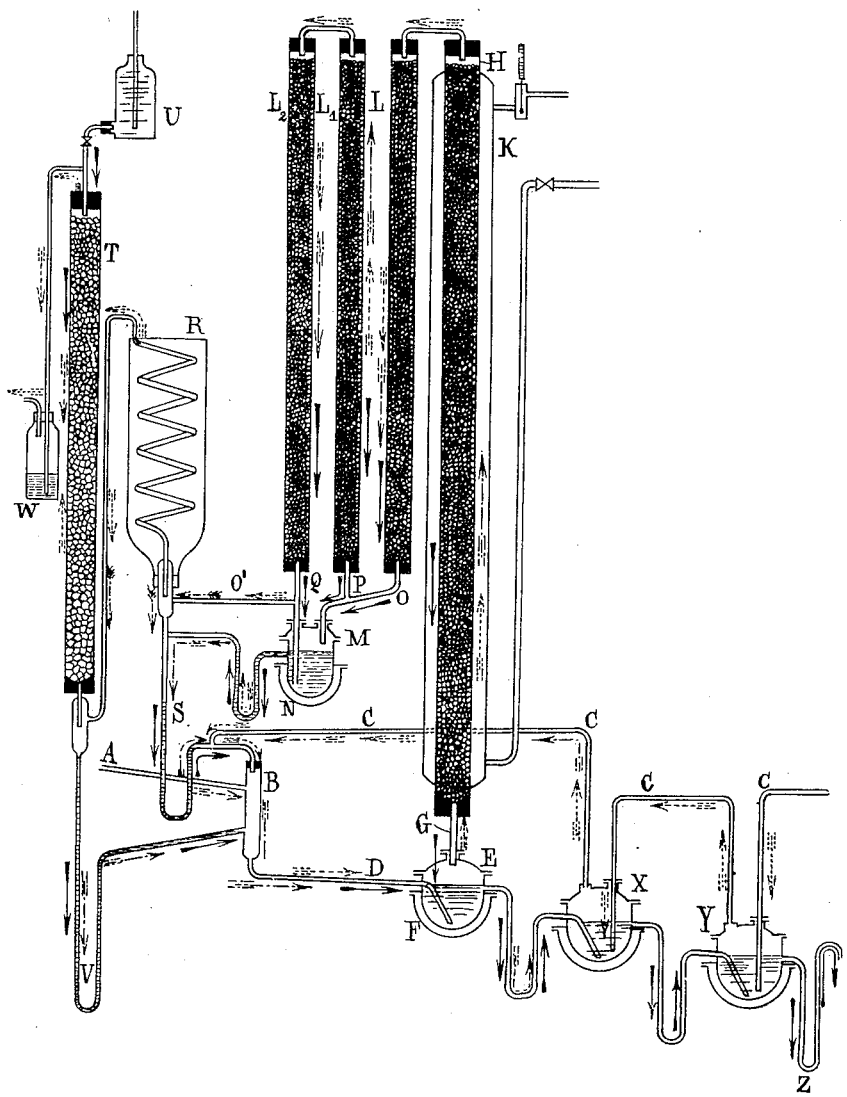
INVENTOR
ALFRED GUYOT
BY Howson and Howson
ATTORNEYS

UNITED STATES PATENT OFFICE.

ALFRED GUYOT, OF SALINDRES, FRANCE, ASSIGNOR TO LA COMPAGNIE DES PRODUITS CHIMIQUES D'ALAIS ET DE LA CAMARQUE, OF SALINDRES, FRANCE, A CORPORATION OF FRANCE.

PROCESS OF MAKING ACETIC ACID BY OXIDATION OF ACETIC ALDEHYDE.

1,409,098.     Specification of Letters Patent.     Patented Mar. 7, 1922.

Application filed April 25, 1918. Serial No. 230,766.

*To all whom it may concern:*

Be it known that I, ALFRED GUYOT, a citizen of the Republic of France, and a resident of Salindres, Department of Gard, France, have invented new and useful Improvements in Processes of Making Acetic Acid by Oxidation of Acetic Aldehyde, (for which I have filed an application in France, March 6, 1917,) of which the following is a specification.

Acetic aldehyde is described in standard works (see for example the Dictionary of Chemistry by Wurtz, part 1, page 40) as a body which is readily oxidizable and capable of directly absorbing oxygen from the atmosphere for transformation into acetic acid.

Great difficulties are, however, encountered as soon as one desires to prepare a large quantity by this method. If, for example, a current of air or oxygen be caused to pass into aldehyde maintained at approximately 0° C. and contained in a balloon provided at its top with a reflux cooler, a sufficiently rapid absorption of oxygen will take place, but no acetic acid will be formed. A colourless liquid will be obtained having a peculiar odour difficult to define and this liquid, on reaching the temperature of the room, will decompose sharply with such development of heat that it would be dangerous to thus prepare even a few centigrams. The product of this violent decomposition is pure concentrated acetic acid.

Thus the initial product resulting from the absorption of oxygen by aldehyde is not acetic acid as generally admitted but a compound, only slightly known and not very stable, the properties of which in the aggregate seem to point to the probability of its being peracetic acid formed by virtue of the equation (1)    $CH_3CHO + O_2 = CH_3CO_2HO$ If subjected to heat it would decompose in accordance with the equation (2)    $CH_3CO_2HO = CH_3COOH + O$ whereas in the presence of aldehyde the decomposition would take place in accordance with the equation (3)    $CH_3CO_2HO + CH_3CHO = 2CH_3COOH$ In both cases the product resulting from this decomposition would be pure acetic acid.

Whatever may be said of these explanations, past experience proves the dangers presented by all processes of oxidation of aldehyde by atmospheric air or by oxygen when no special precautions are taken to prevent accumulation of these products having so little stability.

To avoid this dangerous accumulation, among other arrangements it has already been proposed to effect the oxidation in the presence of certain catalyzers which bring about the decomposition of the peracetic acid as and when it is formed.

Among these catalyzers, manganese salts have been proved to be particularly active (see French Patent No. 460971 filed July 25th 1913).

It has also been proposed (see U. S. Patent 1,081,959 and British Patent 8076/12) to carry out the oxidation of acetaldehyde vapour by means of air or oxygen at temperatures of say 80° to 100° C. in oxidation towers, either in the presence or absence of a catalyzer, and in these circumstances, in normal working, peracetic acid, if formed, will be decomposed in the oxidation towers. When working without a catalyzer it may sometimes happen, however, that owing to accidental cooling of the towers, etc., this decomposition of peracetic acid does not occur and the resulting accumulation of this peracetic acid would involve danger of an explosion.

It is the object of the present invention to provide a precautionary measure against such a contingency in a process of this type, and, therefore, in accordance with the present invention, I cause the liquid products, resulting from the oxidation of the acetaldehyde vapour by air or oxygen in oxidation towers in the absence of any catalyzer, to flow out in a continuous manner, in proportion to their formation, and directly, from the oxidation towers into a supplementary heating apparatus, which latter is maintained at such a temperature that any peracetic acid, formed during the reaction of oxidation and which may have escaped decomposition in these oxidation towers, is instantly destroyed in this supplementary heating apparatus, thereby avoiding the dangers resulting from accumulation of this peracetic acid in the oxidation apparatus.

The temperature at which the operation should be carried on in order to effect this destruction depends upon a set of conditions, such as the pressure, the richness of the liquid in peracetic acid etc. In practice it has been found that by maintaining a temperature of 100° C. in the chamber or chambers, in which this destruction is to take place, complete decomposition is always assured.

Under these conditions the oxidation of the aldehyde and its conversion into acetic acid is carried on in an absolutely regular and safe manner.

The accompanying diagrammatic drawing illustrates by way of example an apparatus adapted to carry out the process, according to this invention, in a continuous manner.

The arrows in dotted lines indicate the direction of flow of the oxygen.

The arrows in chain lines indicate the direction of flow of the aldehyde.

The arrows in full lines indicate the direction of the flow of acetic acid.

The aldehyde in either a liquid or a gaseous state is conveyed to the apparatus by a pipe A and in the chamber B meets a current of oxygen or atmospheric air, delivered by a pipe C. The gaseous mixture thus formed passes by a pipe D into a decomposing vessel E in which, as will be hereinafter described, all the acetic acid produced by the apparatus is collected. After passing through this acid which is maintained at about 100° C. by a steam jacket F, the gaseous mixture flows through the pipe G into the oxidation column H. This column is a tube, several metres in length, filled with filling material proof against acetic acid, such as quartz, broken glass, roasted pyrites and the like and surrounded by a jacket K in which a circulation of water is maintained. An energetic oxidation of the aldehyde takes place in this first column and the consequent amount of heat given off necessitates the cooling by water, assuming that the operation is being carried out by columns having a diameter of several decimetres. The acetic acid when and as it is formed in this first column falls into the decomposing vessel E, carrying with it any peracetic acid that may have escaped decomposition in the column H, which peracetic acid on reaching a temperature of 100° C. in the presence of aldehyde, is instantly decomposed (forming acetic acid, see reaction 3). During normal operation, however, the temperature in this first column is sufficiently high so that any peracetic acid that may be formed there is destroyed at once therein. It is only occasionally when the column happens to be cooled down due, for example, to an abnormally heavy feed of aldehyde, that the peracetic acid formed can flow back as far as the decomposing vessel before being destroyed.

On leaving this first column, the gaseous mixture passes through a series of other identical columns L, $L^1$, $L^2$ wherein the oxidation of the small amount of aldehyde still remaining is completed.

In consequence, owing, on the one hand, to the gradually increased dilution of the gaseous mixture with aldehyde and on the other hand the gradually diminished velocity of the gaseous mixture in successive columns, resulting in a diminished volume of the gases, the increase of temperature observed diminishes from one column to the next succeeding and it is scarcely noticed in the last column. The chances of peracetic acid forming there accordingly become gradually greater, but here also the acetic and peracetic acids formed in these different columns fall as and when formed through the pipes O, P, Q, S, B, D, into the decomposing vessel E where the peracetic acid is at once destroyed. M is a liquid seal which compels the gaseous mixture (air and acetic aldehyde vapors) coming from the bottom of L to pass into $L_1$ and for causing the gaseous mixture from the bottom of $L_2$ to pass into the cooled condenser R, there is provided the liquid seal device M and branch pipe O'. In order to avoid an accumulation of peracetic acid in M, a temperature of 100° C. is maintained there by a steam jacket N. On leaving the last column, the gaseous mixture is now a very small volume, (especially when the apparatus has been fed with oxygen, and comprises but a small quantity of carbonic acid resulting from a secondary reaction, a small quantity of aldehyde and a small quantity of oxygen which have taken no part in the reaction, and some inert gases). The gaseous mixture then passes by pipe O' into a controlling apparatus constituted by a back-flow cooler R maintained at about 0° C. In normal working, aldehyde should not be condensed in the cooler; otherwise the aldehyde feed must be reduced. Should any aldehyde become condensed in the cooler, it will return into the circuit of the gaseous mixture through the pipe S.

The last column T, constructed in the same manner as the preceding columns, is intended to remove from the gaseous mixture, before it is exhausted into the atmosphere, the small quantity of aldehyde which it may still hold. To this end the column is constantly fed with concentrated acetic acid supplied from a reservoir U. The acetic acid takes up the aldehyde very readily and, leaves the gaseous mixture completely free from it. The aldehyde thus recovered re-enters the general circulation in the form of an acetic acid solution through the pipe V.

On leaving this last column, the gaseous mixture now entirely free from aldehyde, passes through the flask W before exhausting into the atmosphere. The flask W permits of the determination of the velocity of the current of gases which should be very low when the apparatus is being fed with oxygen; said current comprises almost solely carbonic acid. The current is naturally much stronger when the apparatus is being fed with atmospheric air, but in regular working not more than 1% of oxygen should be included.

As seen, the acetic formed in the several columns and the acetic acid resulting from the washing of the gas all runs into the decomposing vessel E where it is saturated with aldehyde, and where it is at once heated enough to decompose any peracetic acid. To remove the aldehyde, all that is required is to cause the acetic acid to flow through a series of receivers X, Y, and so on arranged in cascade and heated to about 100° C. and through which the current of air or oxygen for feeding the apparatus is caused to bubble. The acetic acid, completely freed from aldehyde by the gaseous current, leaves the pipe Z in a nearly chemically pure state, while the aldehyde is carried by the gaseous current into the oxidation columns.

It is to be understood that many modifications may be applied to this arrangement of apparatus which do not alter the principle of its operation and in particular, for example, the number of the oxidation columns may be increased or between each column or group of columns a supplementary feed for the aldehyde and oxygen may be introduced whereby all the columns will operate with a like intensity, or the series of receivers X, Y, and so on may be replaced by a small rectifying column. It is of course to be understood that the supply of oxygen need not be pure oxygen, but may be obtained from gas rich in oxygen—such as atmospheric air.

I claim:—

1. A process of making acetic acid which comprises subjecting acetic aldehyde vapor to oxidation in a reaction space and in the absence of any catalyzer, removing the resulting liquid product from the said reaction space as formed, and subjecting the same at once, directly after leaving said reaction space, to a temperature of approximately 100° C., to destroy any peracetic acid present in said liquid product together with acetic acid.

2. A process of making acetic acid which comprises bringing together acetic aldehyde vapor and a gas containing free oxygen, into a reaction space, whereby acetic acid is formed, removing the resulting liquid product from the said reaction space as formed, and subjecting the same at once, directly after leaving said reaction space, to a temperature of approximately 100° C., to destroy any peracetic acid present in said liquid product together with acetic acid.

3. A process of making acetic acid which comprises bringing together acetic aldehyde vapor and a gas containing free oxygen, into a reaction space whereby acetic acid is formed and at once subjecting the acetic acid formed to a temperature of at least approximately 100° C., to thereby decompose any peracetic acid formed therewith.

In testimony whereof I have signed my name to this specification, in the presence of two subscribing witnesses.

ALFRED GUYOT.

Witnesses:
H. CARTIER,
A. GETZ.